UNITED STATES PATENT OFFICE.

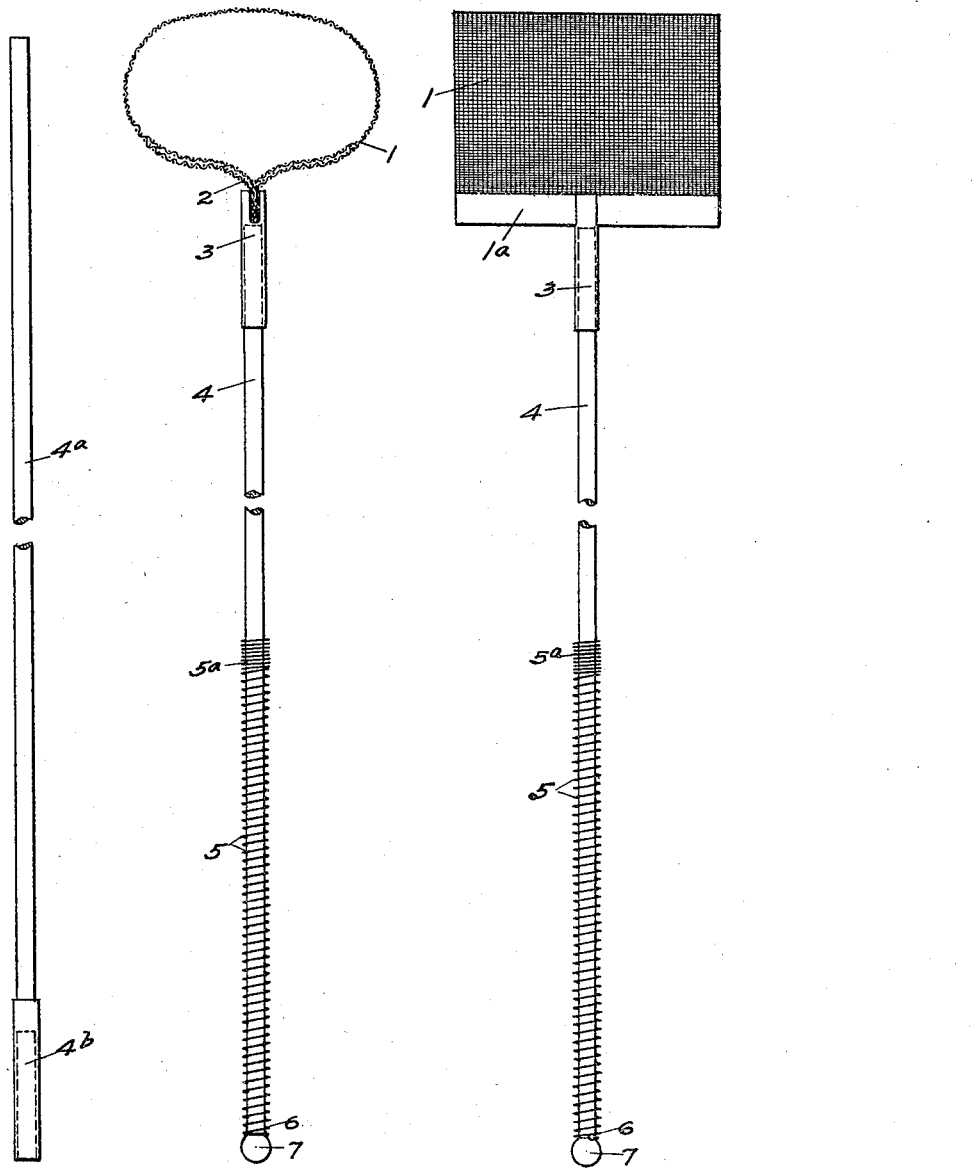

EDWIN E. THOMAS, OF PORTLAND, OREGON, ASSIGNOR TO H. O. TENNEY, OF PORTLAND, OREGON.

FLY-SWATTER.

1,317,999.      Specification of Letters Patent.      Patented Oct. 7, 1919.

Application filed January 16, 1917. Serial No. 142,653.

*To all whom it may concern:*

Be it known that I, EDWIN E. THOMAS, a citizen of the United States, residing in the city of Portland, county of Multnomah, and State of Oregon, have invented certain new and useful Improvements in Fly-Swatters, of which the following is a specification.

My invention relates to Fly Swatters and has for its principal object to provide a fly swatter with which flies on the ceiling, as well as on a wall or window, can be reached, and which also, in its use, affords certain amusement for the young which will stimulate their play with the device, and in their play therewith make good use thereof.

I have illustrated one practical embodiment of my invention on the accompanying sheet of drawings in which:—

Figure 1 is an edge view thereof;

Fig. 2 is a side view thereof; and

Fig. 3 is a view of an insert extension by means of which the handle can be extended to greater length.

Referring in detail to the drawings, my invention, as here illustrated, comprises a fly swatting element 1, which in the present embodiment is made of a loop of wire fabric which may be of any suitable width and preferably doubled at its attached end, as at 2, where it is attached to a socket member 3, by means of a clamping strip 1$^a$. An operating rod 4, has one end inserted in said socket member 3, and is provided at its opposite end with a long coiled spring 5, secured thereto at its lower end, as at 6, where said rod is preferably provided with a grip knob 7. Said spring 5, is preferably provided at its upper end with a series of closely wound coils 5$^a$, forming a grip for the fingers.

In use, said spring is gripped at 5$^a$, with one hand, and said grip knob 7, is gripped by the other hand and the rod pulled back through the spring, extending the spring in such a manner that when the grip knob 7, is released said rod 4, and the swatting member 1 will be thrust forwardly by the spring. The swatting member 1, of course, will be directed at a fly on the wall or window, and the action is something like shooting an arrow with a bow, only in this case the rod 4, which corresponds to the arrow, is not released.

In order to extend the rod 4, to a length sufficient to reach the ceiling, an insert extension rod 4$^a$, is provided, the upper end of which is inserted in the socket member 3, while its lower end is provided with a socket member 4$^b$, adapted to receive the upper end of the rod 4.

The swatting element 1, being of loop-like construction, is very flexible and will do no damage, and yet is sufficiently stiff to kill the flies against the wall or window without the objectionable feature of mashing them, and at the same time is of sufficient area to insure hitting them.

I am aware that slight changes can be made in the details of my invention without departing from the spirit thereof, and I do not, therefore, limit the invention to the embodiment here shown, except as I may be limited by the hereto appended claim.

I claim:

A fly swatting device comprising in combination a rod provided at its end with a loop of woven wire fabric, said fabric being open at both ends and adapted to have its outer surface bear flatwise against a surface whereby to contact therewith over the entire area covered by its engaging portion, and means for yieldingly thrusting said loop against a surface, substantially as described.

Signed at Portland, Multnomah county, Oregon, this 2nd day of January, 1917.

EDWIN E. THOMAS.

In presence of—
I. M. GRIFFIN,
J. C. STRENG.

Copies of this patent may be obtained for five cents each, by addressing the "Commissioner of Patents, Washington, D. C."